(No Model.)
D. B. ROBERTSON & J. T. HOLLAND.
CORN THINNER.
No. 418,656. Patented Dec. 31, 1889.
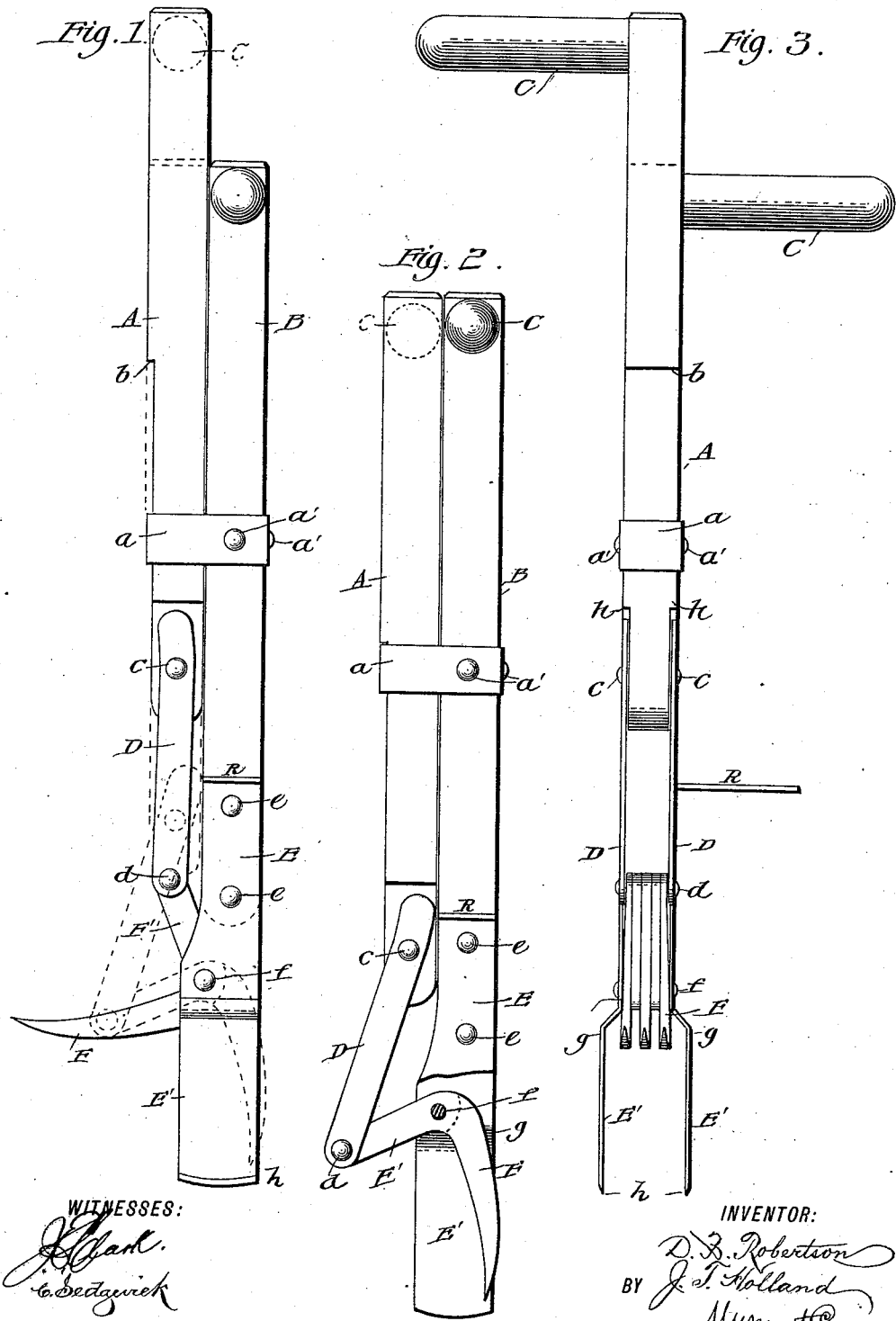
WITNESSES:
INVENTOR:
D. B. Robertson
J. T. Holland
BY Munn & Co.
ATTORNEYS.

UNITED STATES PATENT OFFICE.

DUDLEY B. ROBERTSON AND JAMES T. HOLLAND, OF PERRYVILLE, KENTUCKY; SAID ROBERTSON ASSIGNOR TO SAID HOLLAND.

CORN-THINNER.

SPECIFICATION forming part of Letters Patent No. 418,656, dated December 31, 1889.

Application filed August 17, 1889. Serial No. 321,145. (No model.)

*To all whom it may concern:*

Be it known that we, DUDLEY B. ROBERTSON and JAMES T. HOLLAND, of Perryville, in the county of Boyle and State of Kentucky, have invented certain new and useful Improvements in Corn-Thinners, of which the following is a full, clear, and exact description.

Our invention relates to an improvement in corn-thinners, and has for its object to provide a simple, inexpensive, and practical device whereby corn, beans, peas, or other similar grain planted in hills or rows may be rapidly thinned by removal of the surplus stalks without injury to those left remaining.

With this object in view our invention consists in certain features of construction and combinations of parts, which will be hereinafter described, and pointed out in the claims.

Reference is to be had to the accompanying drawings, which make a part of this specification, in which similar letters of reference indicate corresponding parts in all the views.

Figure 1 is a side elevation of the device, dotted and full lines showing two positions of the adjustment of the working parts. Fig. 2 is a side view of the implement adjusted to be inserted in the ground, a portion being broken away to show the thinning-fork; and Fig. 3 is a front elevation of the implement with the thinning-fork rocked to elevate its tines.

The device is provided with two standards A B, which are of equal thickness, and preferably made rectangular in cross-section. These standards are adapted to slide one upon the other by the loops $a$, which loosely embrace the standard A, and are rigidly attached to the other standard B by the screws or rivets $a'$. At $b$ an offset shoulder is formed on the standard A, which limits its downward-sliding movement by its abutment on the loop $a$. Two handles C are affixed to the standards and project oppositely at their upper ends.

Upon the lower end of the standard B two guard-plates E are bolted or riveted, as at $e$. These plates are offset at $g$ to afford clearance for the thinning-fork F, and are extended down a suitable length parallel to each other, as shown in Fig. 3 at E', their lower free ends $h$ being sharpened to afford cutting-edges, and thus permit their ready insertion into the soil. Between the guard-plates E, above the offset bends $g$, the thinning-fork F is pivoted at $f$. Said fork is provided with any suitable number of tines, which are spaced apart, and are held thus parallel to each other by their secure attachment to a head-block F'.

At $d$ two links D are pivoted to the outer end of the head-block F', and at $c$ these links are loosely secured by a pivot-bolt or rivet to the lower end of the sliding standard A. As the tines of the thinning-fork are secured to the head-block F' nearly at right angles thereto, and the pivotal point of support $f$ of the bent fork thus produced is at the vertex of the angular bend in the same, it is evident that when the two handles C are adjusted to be in line with each other, as shown in Fig. 2, the fork-tines will be nearly vertical, with their points ready for insertion in the ground.

In using the device the parts are adjusted as shown in Fig. 2. The operator, grasping both handles C with his hands, shoves the guard-plates and fork-tines down into the soil near to a stalk of corn which is to be removed. Pressure is maintained on the standard B, while the handle on standard A is drawn upward. This will rock the fork F so as to elevate its tines, as shown in full lines in Fig. 1, and remove the cornstalk.

A foot-rest R, that is secured to the side of one of the guard-plates, conveniently aids the insertion of the "thinner" by foot-pressure applied thereon.

The thinning implement as constructed is very convenient for its special use, as "suckers" or small stalks of corn in the hills, which must be removed, can be cut loose by the sharp edges of the guard-plates E, and then be safely uprooted by the fork-tines, in the manner already explained.

Having thus described our invention, what we claim as new, and desire to secure by Letters Patent, is—

1. The combination, with two standards that are adapted to slide together in parallel planes and are prevented from displacement by guiding-loops, of a bent fork pivoted on the lower end of the standard, and a link that connects the fork with the other standard, so as to rock the fork and elevate or depress its tines, substantially as set forth.

2. The combination, with two standards provided with handles and adapted to slide together longitudinally, and two guard-plates secured to the lower end of one standard, of a series of fork-tines secured to a head-block about at a right angle thereto, and two link-bars which are pivoted to the end of the head-block, and also to the lower end of the other or sliding standard, substantially as set forth.

DUDLEY B. ROBERTSON.
JAMES T. HOLLAND.

Witnesses:
J. B. GUTHRIE,
J. H. WEST.